June 12, 1951 W. D. HOUGHTON 2,556,693

ELECTRONIC SWITCH

Filed Oct. 25, 1949 2 Sheets-Sheet 1

INVENTOR
William D. Houghton
BY Harry Tunick
ATTORNEY

June 12, 1951 W. D. HOUGHTON 2,556,693

ELECTRONIC SWITCH

Filed Oct. 25, 1949 2 Sheets-Sheet 2

INVENTOR
William D. Houghton
BY Harry Tunick
ATTORNEY

Patented June 12, 1951 2,556,693

UNITED STATES PATENT OFFICE 2,556,693

ELECTRONIC SWITCH

William D. Houghton, Port Jefferson, N. Y., assignor to Radio Corporation of America, a corporation of Delaware Application October 25, 1949, Serial No. 123,442

17 Claims. (Cl. 332—9)

Figure 1:
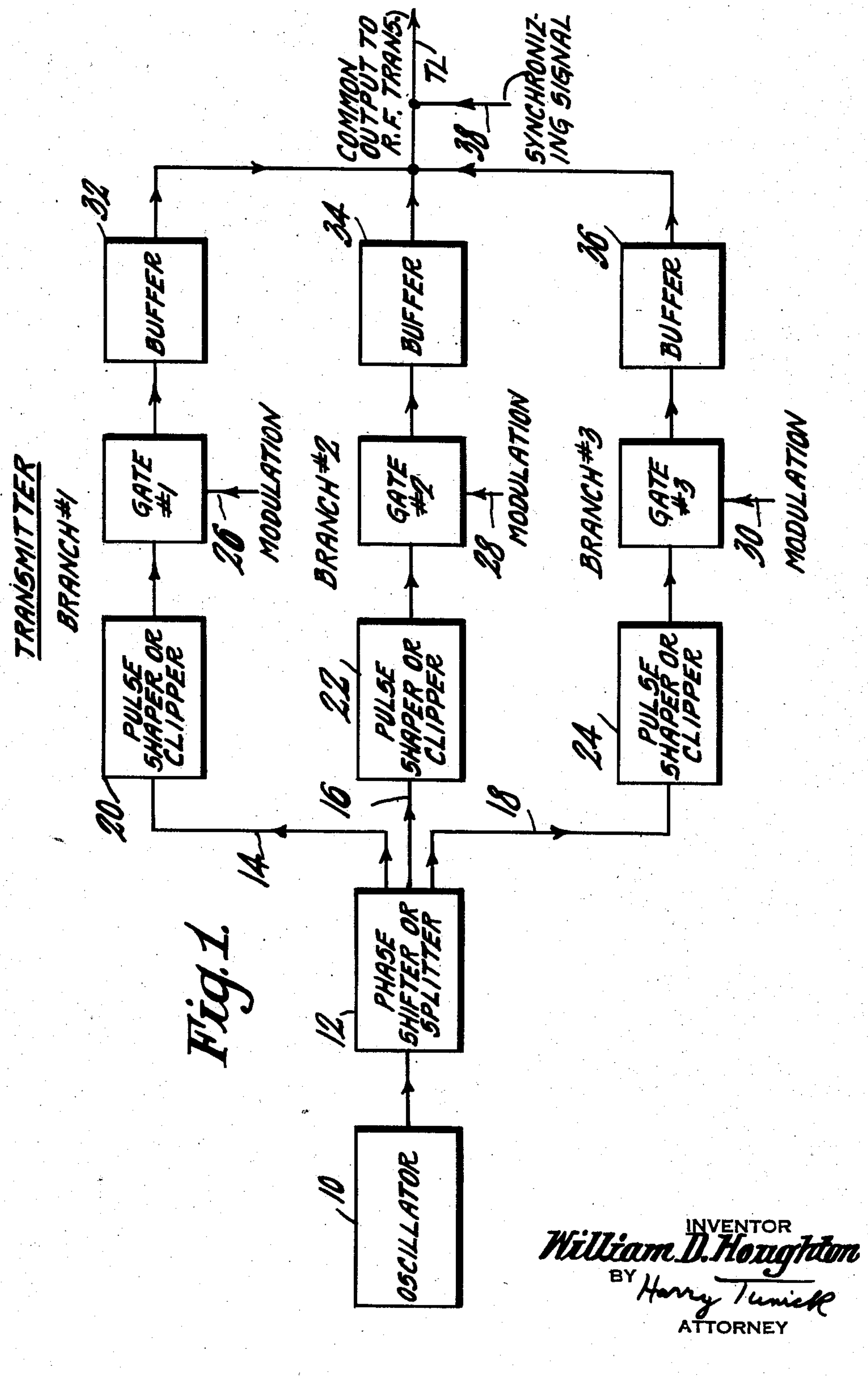

This invention relates broadly to an electronic switch for selectively coupling a signal source to an output circuit. From a more specific aspect, the invention relates to an electronic commutator employing a plurality of electronic switches under control of a common source of recurring waves for sequentially assigning a common transmission circuit or single channel to a plurality of branch circuits or subchannels.

Such electronic communtators are especially useful at the transmitting and receiving terminals of a time division multiplex system in which the commutator functions to sequentially connect a common output or common input circuit to a plurality of separate intelligence carrying branch circuits.

The electronic switch of the invention is in the nature of a keyer and is hereinafter referred to as a "gate" which responds to a control wave or pulse for enabling the passage therethrough of a sample of the intelligence to be carried by the system. A plurality of these electronic switches, each individual to a particular branch circuit or subchannel, compose the electronic commutator, and are successively controlled by time displaced control waves, to thereby sequentially connect the individual branch circuits for mutually exclusive (or, if desired, overlapping) time intervals to a common transmission medium. At the transmitting terminal of a time division multiplex system, this transmission medium may be the common output circuit feeding any suitable radio transmitter, while at the receiving terminal of the system this transmission medium may be the common input circuit constituting the output of a radio receiver.

Briefly, the electronic switch or gate of the invention comprises a pair of grid-controlled vacuum tubes having a common cathode resistor. Obviously, the electrodes of these tubes can be contained within a single evacuated envelope. One tube is normally biased to pass sufficient anode current to bias the other tube to the anode current cut-off condition due to a biasing voltage being developed across the common cathode resistor. The anodes of both vacuum tubes are connected together through a suitable impedance network and thence through a common anode resistor to the positive terminal of a source of unidirectional potential. The intelligence or modulation to be passed by the switch is coupled to the grid of the normally cut-off tube, while a control wave is coupled to the grid of the normally current passing tube. The control wave is in the form of a negative pulse of relatively short duration and of sufficient magnitude to rapidly bias the normally current passing tube to the anode current cut-off condition. Thus, when the normally current passing tube is cut-off by the negative pulse on its grid, the other tube will become conductive substantially for the duration, or if desired, the peak, of the control wave and will permit the intelligence or modulation to pass therethrough for a short time interval. This short time interval is variable over a range by suitable choice of the circuit parameters. When this last tube becomes conductive, it acts as a class A or linear amplifier and amplifies a small time portion or sample of the intelligence wave or modulation to be passed. The amplitude of the small time portion or sample of the modulation is a function of the instantaneous amplitude of the modulating signal at the particular time of operation.

The component circuit elements of the switch are given such values and are so related that for a predetermined level of modulation, there will be no pulse output from the switch during the application of the negative control pulse to the normally current passing vacuum tube. This is achieved by balancing (at the anode connected to the other tube) any tendency for a voltage change caused by the cessation of current in one tube by an opposite voltage change caused by the flow of current in the other tube, for the particular level of modulation selected. Stated in other words, the change in voltage due to the cessation of current in the control tube is balanced by a voltage change resulting from an increase in current in the controlled tube. By the proper choice of circuit constants, the voltage may be made constant even though the decrease in current due to one tube does not equal the increase in current in the other.

Figures 2, 3:
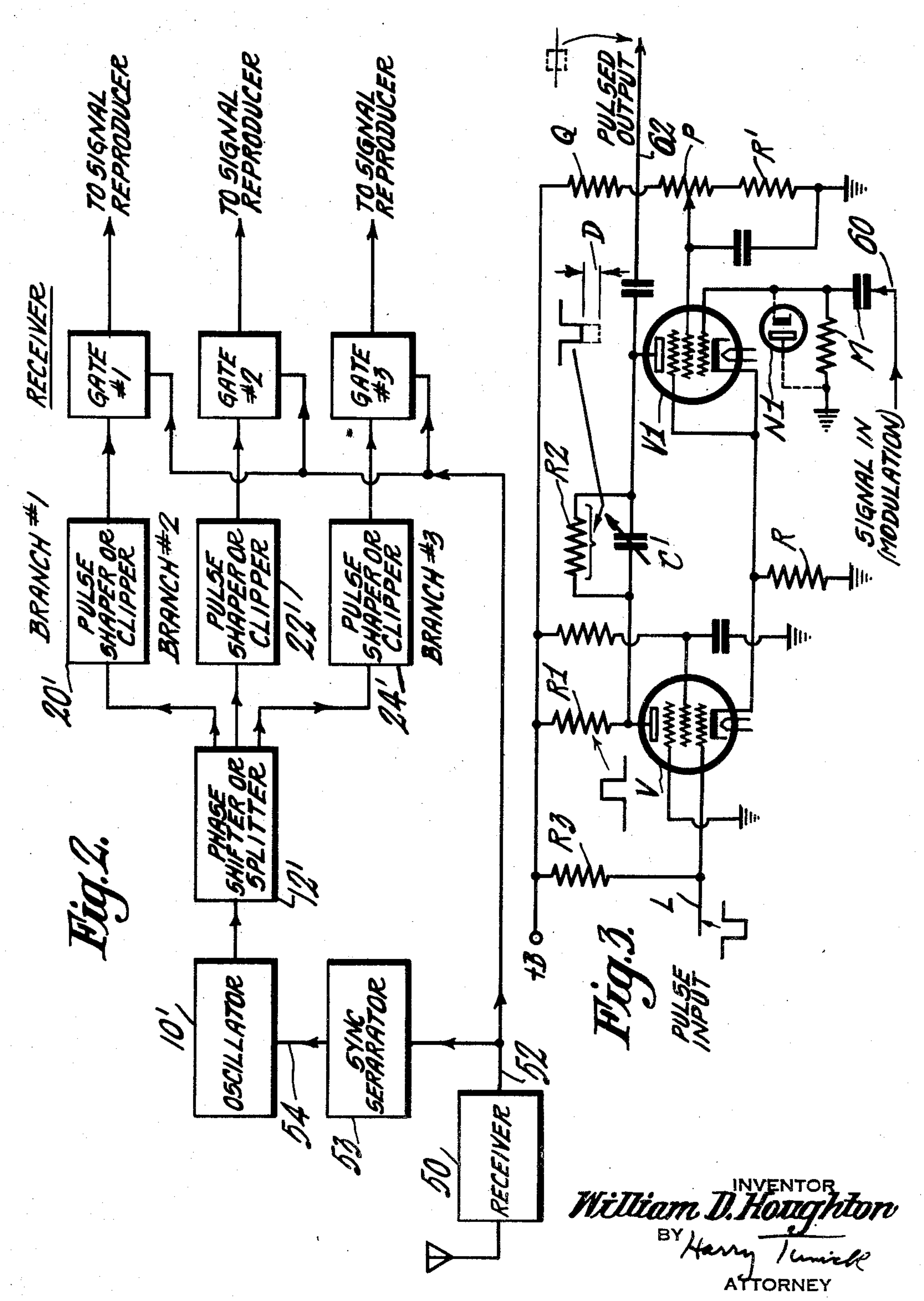

A more detailed description of the invention follows, in conjunction with drawings, wherein:

Figs. 1 and 2 diagramatically illustrate transmitter and receiver terminals of a time division system employing electronic commutators in accordance with the principles of the invention; and Fig. 3 is a schematic circuit diagram of one electronic switch or "gate" of the several which compose the electronic commutator of Figs. 1 and 2.

Referring to Fig. 1 there is shown a time division multiplex transmitter having a plurality of branch circuits or subchannels 1, 2 and 3, each of which has its own modulation applied thereto, feeding a common output circuit TL. This common output circuit may feed a direct wire line or, if desired, control any suitable radio frequency oscillator or transmitter circuit for modulating a single carrier wave.

A sine wave oscillator 10 feeds a phase shifter or phase splitter 12 which, in turn, produces on leads 14, 16 and 18 three phase-displaced sinusoidal waves of the same frequency as the oscillator 10. The phase-displaced waves on leads 14, 16 and 18 are time displaced at 120 degree intervals relative to each other for sequentially controlling the keyers or gates 1, 2 and 3 of the transmitter commutator or sampler. The phase shifter 12 may comprise suitable circuits having combinations of lumped inductance, resistance and capacity, or artificial delay lines having different electrical lengths.

Between each gate and the phase shifter 12 is a pulse shaper or clipper 20, 22 or 24 which produces in its output short pulses of negative polarity in response to the control wave applied to its input. The pulse shaper or clipper is illustrative of any circuit which will reshape the applied control wave or generate a pulse preferably having a peak with steep starting and trailing slopes or edges.

The negative polarity pulses in the outputs of the pulse shapers are phase-displaced relative to one another and sequentially control the gates to permit samples or bursts of modulation to pass through the gates. Gates 1, 2 and 3 are separately supplied with the intelligence signals or modulations in their respective branch or subchannel circuits. Gate #1 is supplied with modulation over lead 26. Gate #2 is supplied with different modulation over lead 28, while gate #3 is supplied with still another intelligence signal over lead 30. Thus the gates pass pulses or samples of the applied modulating signals at the same frequency or repetition rate as the sine wave oscillator 10 but the different samples occur at different times. The modulation or intelligence applied to each gate is preferably an amplitude varying signal. The pulses from the different gates are of equal duration. They may be short compared to the time intervals between them, contiguous, or even overlapping, depending upon the duration of the control pulses applied to the gates by the pulse shapers. The pulse output from each gate will therefore be an amplitude modulated pulse or sample whose amplitude is a function of the instantaneous amplitude of the modulation at the time the gate "opens." Stated otherwise, the gates are in the nature of balanced modulators and the outputs therefrom are independently modulated by independent programs or modulation.

Each gate is followed by a buffer vacuum tube amplifier 32, 34 or 36 and the outputs from these buffers are combined in a common output lead TL. The buffers prevent interaction between the respective gates and the pulse outputs in the common output lead. In some applications, the buffer circuits may be eliminated, although the use thereof enables shorter duration pulse samples to be accommodated.

The common output lead may be coupled to a suitable high frequency radio transmitter, not shown, for modulating a single carrier wave. If desired, this output lead may be connected to a standard wire line or coaxial cable.

In order to synchronize the sampling or commutation controlling oscillator at the remote receiving terminal of the system with the oscillator 10 at the transmitter, there is injected into the common lead TL a synchronizing pulse via lead 38. This synchronizing pulse may emanate from a suitable synchronizing generator operating at the same repetition rate or frequency as the sine wave oscillator 10, and the pulse may occur at the beginning or end of each group of pulses from the different branches or subchannels. If it is assumed that there are only three branches, as shown in Fig. 1, each group of pulses will be composed of a pulse from gate #1, followed by a pulse from gate #2, then followed by a pulse from gate #3, then followed by a synchronizing pulse. The synchronizing pulse in each group may obviously precede the subchannel pulses. In order to distinguish the synchronizing pulse from the intelligence modulated pulses, the synchronizing pulse may be made wider than the other pulses or given a greater amplitude than the other pulses, or both.

When the invention is employed in a telephone multiplex system in which speech waves are employed for the modulation, the pulse rate in each branch or subchannel should be equal to at least twice that of the highest speech wave frequency. However, when the invention is employed in a three color television system in which bits of information from three color branches or subchannels are sequentially sampled, the pulse rate in each branch or subchannel may be anywhere in the range of 2.8 to 4.0 megacycles per second, preferably around 3.8 megacycles, and the pulse output from each branch or subchannel should be less than the 120 degree time interval allotted to it. In the last case the synchronizing pulses occur at a rate different from the frequency of the sine wave oscillator 10; for example, 15,750 cycles per second compared to a sampling frequency of 3,800,000 cycles per second. The synchronizing generator would then control the operating frequency of the sine wave generator. The modulations on leads 26, 28 and 30 will come from separate color cameras. Leads 26, 28 and 30 correspond to the leads GL, RL and BL in the circuit diagram of Fig. 1 of the publication entitled "A Six-Megacycle Compatible High Definition Color Television System," dated September 26, 1949, prepared by the Radio Corporation of America for the Federal Communications Commission. The electronic commutator of the invention replaces the sampler shown on Fig. 1, page 2, and Fig. 4, page 6 of this publication.

The apparatus at the receiving terminal is shown in Fig. 2 and comprises a radio receiver 50 of the superheterodyne type which receives the radio wave from the remote transmitter and converts the same to a video pulse wave in its output lead 52. The train of pulses in the output of the receiver is passed on to the three gates 1, 2 and 3 of the different branches, and also to the synch separator 53. The synch separator separates the synch pulse from the intelligence carrying subchannel pulses, by virtue of the differences in their characteristics, and produces on lead 54 a pulse which synchronizes the operation of the sine wave oscillator 10'. Suitable synchronizing separators which can be used are well known in both the telephone multiplex and television arts. Sine wave oscillator 10' operates at the same frequency as the sine wave oscillator 10 at the remote transmitting terminal.

Since the electronic commutator at the receiving terminal, Fig. 2, is similar in construction and operation to the electronic commutator at the transmitting terminal, Fig. 1, the same parts at both terminals have been given the same reference numerals but with prime designations at the receiving terminal.

The pulse shapers or clippers 20', 22' and 24' receive the phase-displaced control waves from the phase shifter 12' and, in turn, produce time displaced negative polarity pulses which sequentially control the gates 1, 2 and 3 for short time intervals to pass the desired video pulses on lead 52 to the different signal reproducers. Positioned between each gate and its respective signal reproducer there may be provided a suitable video amplifier, not shown. The signal reproducers may be suitable electromagnetic transducers, such as recorders, loudspeakers, headphones, kinescopes, etc. The different gates 1, 2 and 3 in the branch circuits of the receiving terminal are made to be responsive to the control pulses from the phase shifter 12' for equal but different time intervals, and the occurrence time of these time intervals correspond to the occurrence time of similar time intervals in the correspondingly numbered branch circuits at the transmitting terminal.

The receiving electronic commutator thus operates synchronously with the transmitting electronic commutator and feeds the selected pulses to each of the signal reproducers in succession. For instance, the information or modulation originating in branch or subchannel #1 at the transmitting terminal will be fed to the signal reproducer in the corresponding branch or subchannel #1 at the receiving terminal, while the information or modulation originating in branch or subchannel #2 at the transmitting terminal will be fed to the signal reproducer in the corresponding branch or subchannel #2 at the receiving terminal, and similarly in regard to branch or subchannel #3.

When the invention is employed in a three color television system, the receiver produces in lead 52 the composite video and synchronizing signals. The synch separator removes the video and sends the synchronizing pulses to the sine wave sampling oscillator 10' and to the deflection circuits for the cathode-ray kinescopes. The sampling oscillator 10' may, for example, utilize the trailing edge of the horizontal scanning pulse to actuate the electronic receiving commutator in synchronism with the transmitting commutator. The commutator samples the composite video signal at the different gates, and the amplitude of each pulse passed by the gates is determined by the amplitude of the composite wave at that particular instant. The signal reproducer circuits for the three branches at the receiver each include a video amplifier which controls, for example, a cathode-ray tube or kinescope. The three different kinescopes have different appropriate color-producing phosphors. Thus one kinescope will have a red phosphor, another a green producing phosphor and the third a blue producing phosphor. The monochrome color records thus produced are then optically combined to form a complete television color image.

Fig. 3 illustrates the circuit details of each of the gates or electronic switches which are used in the three branch circuits or subchannels at both the transmitting and receiving terminals. This gate is in the nature of a keyer or modulator circuit and composes two pentode vacuum tuves V and V1 having a common cathode resistor R. The anodes of the two tubes are connected together through a resistor R2 shunted by a condenser C. The anode polarizing potential is supplied to the anodes from +B through a common anode resistor R1. It should be noted that the control grid of tube V is connected to the +B supply through a resistor R3, for which reason the control grid is normally at a slightly positive potential relative to ground and tube V draws a predetermined value of anode current. This anode current is sufficient to produce a voltage drop in common cathode-resistor R of such magnitude as to bias the tube V1 to cut-off; that is, the anode current cessation condition. The control grid of tube V is connected to lead L extending to the pulse shaper or clipper of Figs. 1 and 2 in order to derive therefrom a control pulse of negative polarity. The control electrode of tube V1 is connected to lead 60 to which the intelligence or modulation is applied. In the case of the transmitting terminal, the lead 60 will correspond to any one of the leads 26, 28 or 30, while in the case of the receiving terminal the lead 60 corresponds to lead 52 extending to the output of the radio receiver.

It will be understood, of course, that although several envelopes have been shown for the tubes V and V1, the electrode structures of both of these tubes can be positioned within a single evacuated envelope to thereby constitute a single tube.

In the operation of the gate of Fig. 3, the application of a negative pulse on lead L of sufficient magnitude to overcome the positive potential supplied to the control grid through resistor R3, will bias the tube V to cut-off. It is preferred, though not essential, that the negative control pulse on lead L be rectangular in shape and have steep edges or slopes. When tube V cuts off, tube V1 will suddenly conduct and permit the intelligence or modulation on lead 60 to pass to the output 62 which is coupled to the anode of tube V1. Tube V1 will be conductive for the same time duration that tube V is nonconductive. The parameters of the circuit are so chosen that when tube V1 conducts it acts as a linear amplifier (class A) and provides an output which is a direct function of the amplitude of the modulation on lead 60. Thus, if the signal modulation on lead 60 is a wave of negative polarity varying from, let us say, zero amplitude or a predetermined level, to maximum negative amplitude, the output from the gate will be a series of negative pulses varying from a predetermined negative value to a smaller amplitude in accordance with the wave sampled.

The resistors R1 and R2 and the screen grid voltage of tube V1 of the gate of Fig. 3 have such values that for a predetermined level of modulation on lead 60 (which may correspond to no-modulation in the case of telephone multiplex system or the black level in a television system), there will be no-pulse output on lead 62. This is accomplished by having the positive rise in voltage across resistor R1 resulting when tube V cuts off equal the amplitude of the pulse developed across the network including resistors R2 and R1 and condenser C when the modulating signal on tube V1 is at the particular level of modulation set for no-pulse output. Stated otherwise, the value of resistor R2 which is shunted by condenser C is such as to obtain neutralization of the voltage changes appearing in the anode circuits of both tubes and a minimum of signal in the output of tube V1 for the no-modulation condition in the case of a telephone multiplex system and for the black level in the case of a three color television system.

In the circuit shown in Fig. 3, tube V carries considerably more current than does tube V1. Hence, when tube V cuts off, the decrease in current flow through resistor $R_1$ is considerably greater than the increase in current through $R_1$ due to the current flowing in tube $V_1$. The value of resistor R1 is so chosen that the voltage drop thereacross due to the current change in tube V is equal and opposite to the voltage drop across $R_1$ and $R_2$ due to the current change in tube $V_1$ for a particular voltage level on the control grid of tube V1. The potentiometer P is used to provide a means of correcting for changes in the transconductances (g'ms) of the tubes and also for any variations encountered in the values of resistors R1 and R2. In effect, potentiometer P is a D. C. balance control which is set for minimum gating transient in the output 62.

It is obvious that if tube V1 is driven from a condenser and grid leak arrangement M, as shown, that the D. C. voltage on V1 grid will be zero and that a sinusoidal modulating voltage will vary the voltage plus and minus about this zero value. If the values of $R_1$ and $R_2$ and potentiometer P are set to give the condition of no pulse when the modulation applied to the grid of tube V1 is zero then the pulse produced on lead 62 will vary positively and negatively about zero. This would be the normal condition for telephone services.

However, for television purposes the D. C. level must be set or clamped at the black level since the signal varies in only one direction from a reference value. In order to provide this D. C. insertion for television operation, a diode N1, shown in dotted lines, should be added. The diode then sets the bias on the grid of tube V1 at a value such that the peaks of the video signal representing black picture information (negative picture signal peaks) reach a negative voltage condition on V1 grid where the tube is on the edge of its linear operating condition. The values of resistors $R_1$, $R_2$, P, Q and R′ are chosen such that no pulses are produced at this negative peak of the grid voltage swing. Under this condition no pulses are applied to the kinescope circuits and hence there is no pattern due to sampling in the black portions of the picture signal. This also permits full use of the linear operating region of tube V1. The condenser and grid leak arrangement M and the diode N1 were used in common for all three gates in the electronic commutator at the receiving terminal, while at the transmitter terminal each gate of the commutator was individually provided with a D. C. level setter N1.

From the foregoing, it will be apparent that the gate of Fig. 3 passes pulses or samples of the modulation at the times of occurrence of the negative pulses on lead L. In the intervals between the negative polarity pulses on lead L, the tube V passes current thereby causing the tube V1 to be cut-off. During these intervals when the tube V1 of the gate is cut-off, one or the other of the other gates is passing a pulse of modulation to the common output circuit, assuming that the gates are controlled at 120 degree intervals relative to each other. If the time interval of the negative polarity pulses on lead L is less than a 120 degree interval, then there will be a space between output pulses from the gates in the branch circuits. The appearance which the pulses may take in lead L, the anode circuit of tube V, resistor $R_2$ and output lead 62 are shown by the pulse waveforms adjacent these elements. The dotted line portion of the pulse across resistor $R_2$ over the range D indicates the amplitude modulation range of the output pulse. The solid line portion of this same pulse indicates the voltage change in the no-modulation condition, and this value is equal to and of opposite polarity to the pulse shown on the anode lead of the tube V.

In one electronic commutator embodiment of the invention employed in the receiver of a three color television system, the basic sampling oscillator operated at 3.8 megacycles, the clipper or pulse shaper of each gate was a 6AG5 pentode, each gate was fed with a control wave which was time displaced 120 degrees relative to the control waves on the other two gates, tube V was a 6AU6 pentode and tube V1 was a 6AG5 pentode. The common cathode resistor R was 470 ohms. Resistor R3 was 270,000 ohms. Resistor R1 was 75 ohms. Resistor R2 was 1500 ohms, while condenser C had a value of 5–50 $\mu\mu f$. The potentiometer on the screen of tube V1 was 100,000 ohms in series with another 100,000 ohm resistor Q leading to the B+ supply on the one side and in series with a 22,000 ohm resistor R′ extending to ground on the other side. In this particular commutator embodiment tried out in practice, the open interval of each electronic gate or switch was short compared to the keying cycle and also short compared to a cycle of the highest modulation frequency. The condenser C served to match the shapes of the two pulses of opposite polarities simultaneously occurring in the anode circuits of the tubes V and V1 during interruptions, so that these two pulses neutralized each other for the predetermined level of modulation at which no output was desired at the high frequencies involved.

It will be understood, of course, that when the system of the invention is employed in a pulse telephone time division multiplex system, it is not limited to an arrangement having only three branches of subchannels, since any suitable larger number of subchannels can be used, nor is the invention limited to the use of a sine wave type of basic sampling oscillator. In fact, in a pulse telephone multiplex time division system, it may be preferred to employ a pulse oscillator generating spaced rectangular waves of constant amplitude, in which case the phase shifter should preferably comprise a plurality of delay lines of different electrical lengths made up of lumped impedances, so as to provide different phase shifts for the control waves applied to the different gates. In using rectangular waves having steep edges, there may be no need for pulse shapers or clippers. A pulse telephone time division multiplex system may have, for example, ten or more subchannels, with the different controlling pulses to the different gates in the electronic commutators at both transmitting and receiving terminals suitably time displaced to enable the gates to respond sequentially for mutually exclusive and equal duration time intervals.

What I claim is:

1. An electronic switch comprising a pair of electrode structures each having a grid, a cathode and an anode, a common cathode resistor for said structures, a common anode resistor for said anodes, means biasing one of said electrode structures to the current passing condition as a result of which current flows in said common cathode resistor and biases said other electrode structure to cut-off, means supplying recurring waves to said one structure of such polarity and magnitude as to bias said one structure recurringly to cut-off thus causing current to flow in said other structure during the application of said recurring waves, means supplying the grid of said other structure with modulation, and means connected between the anodes of said structures for neutralizing the effect of the rise in voltage on the anode of said one structure in its cut-off condition by an equal drop in voltage caused by the current flow in the other structure, for a predetermined level of modulation.

2. An electronic switch comprising first and second electrode structures each having a grid, a cathode and an anode, a common cathode resistor for said structures, a common anode resistor for said structures, a resistor-shunt capacitor network connected between said anodes, means biasing said first electrode structure to the current passing condition as a result of which current flows in said common cathode resistor and biases said second structure to cut-off, means supplying recurring negative polarity waves to the grid of said first structure of such magnitude as to recurringly bias said first structure to cut-off, thus causing current to recurringly flow in said second structure, and means supplying modulation to the grid of said second structure, the parameters of the circuit being such that said second structure is biased to operate as a linear amplifier in its current passing condition, said network having such values and being so related to the value of said anode resistor that there is negligible output from said linear amplifier in its current passing condition for a predetermined value of modulation applied thereto.

3. In a pulse generating system, the method which includes producing recurring pulses of a single polarity and of constant amplitude in response to control waves, simultaneously producing other pulses of opposite polarity whose amplitude varies in accordance with the instantaneous amplitude of a modulating wave, combining said pulses of different polarities, and producing output pulses of said opposite polarity solely when the amplitude of said other pulses differs from the amplitude of said first pulses.

4. In a pulse generating system, the method which includes producing recurring pulses of a positive polarity and of constant amplitude in response to control waves, simultaneously producing other pulses of negative polarity whose amplitude varies linearly in accordance with the instantaneous amplitude of a negative modulating wave, combining said pulses of different polarities, and producing output pulses of negative polarity solely when the amplitude of said other pulses differs from the amplitude of said first pulses.

5. In a pulse generating system, the method which includes producing recurring pulses of a single polarity and of constant amplitude in response to a recurring control wave, simultaneously producing other pulses of opposite polarity whose amplitude varies linearly in accordance with the instantaneous amplitude of a modulating wave of said same single polarity, combining said pulses of different polarities, selecting the parameters of the system such that said combined pulses substantially neutralize each other for a predetermined level of modulation, and producing unidirectional output pulses solely when the amplitude of said other pulses exceeds the value required for neutralization of said first pulses.

6. In a pulse generating system, the method which includes recurringly producing in a plurality of different paths single polarity pulses of constant amplitude which are of the same frequency but time displaced in the different paths, simultaneously producing with the occurrence of the pulses in each path other pulses in that same path of opposite polarity whose amplitude varies in accordance with the instantaneous amplitude of a modulating wave, combining the pulses of different polarities in each path, producing output pulses in each path of said opposite polarity solely when the amplitude excursion of said other pulses exceeds the amplitude of the first pulses, and combining the outputs from the different paths.

7. An electronic switch comprising a pair of electrode structures each having a grid, a cathode and an anode, a common cathode resistor for said structures, means for supplying said anodes with a unidirectional potential which is positive relative to said cathodes, an anode resistor connected between said means and one of said anodes, means biasing that electrode structure containing said one anode to the current passing condition as a result of which current flows in said common cathode resistor and biases said other electrode structure to cut-off, means supplying recurring waves to said current passing structure of such polarity and magnitude as to bias said structure recurringly to cut-off thus causing current to flow in said other structure during the application of the peaks of said recurring waves, means supplying the grid of said other structure with modulation, and means connected between the anode end of said anode resistor and the other anode for neutralizing the effect of the rise in voltage on the anode of said normally current passing structure in its cut-off condition by an equal drop in voltage caused by the current flow in the other structure, for a predetermined level of modulation.

8. An electronic commutator comprising a plurality of electronic switches having a common transmission circuit coupled thereto, a basic oscillator supplying time displaced recurring waves of the same repetition rate to said electronic switches for sequentially controlling said switches, each of said switches including the following: a pair of electrode structures each having a grid, a cathode and an anode, a common cathode resistor for said structures, a common anode resistor for said anodes, means biasing one of said electrode structures to the current passing condition as a result of which current flows in said common cathode resistor and biases said other electrode structure to cut-off, means supplying from said basic oscillator recurring waves to said one structure of such polarity and magnitude as to bias said one structure recurringly to cut-off thus causing current to flow in said other structure during the application of the peaks of said recurring waves, means supplying the grid of said other structure with modulation, and means connected between the anodes of said structures for neutralizing the effect of the rise in voltage on the anode of said one structure in its cut-off condition by an equal drop in voltage caused by the current flow in the other structure, for a predetermined level of modulation.

9. An electronic commutator as defined in claim 8, wherein said common transmission circuit is an output circuit which is coupled to the anodes of those electrode structures in said electronic switches to whose grids the modulation is supplied.

10. An electronic commutator as defined in claim 8, wherein said common transmission circuit is an input circuit which supplies the modulation to said electronic switches.

11. An electronic switch comprising first and second pentode electrode structures each having a grid, a cathode and an anode, a common cathode resistor for said structures, a common anode resistor for said structures, a resistor-shunt capacitor network connected between said anodes, means biasing said first electrode structure to the current passing condition as a result of which current flows in said common cathode resistor and biases said second structure to cut-off, means supplying recurring negative polarity waves to the grid of said first structure of such magnitude as to recurringly bias said first structure to cut-off, thus causing current to recurringly flow in said second structure, and means supplying modulation to the grid of said second structure, means for deriving output from the anode of said second structure, a D.C. balance control in the form of a potentiometer coupled between the anode and cathode of said second structure and having a tap connected to the second grid of said second structure, the parameters of the circuit being such that said second structure is biased to operate as a linear amplifier in its current passing condition, said network having such values and being so related to the value of said anode resistor that there is negligible output from said linear amplifier in its current passing condition for a predetermined value of modulation applied thereto.

12. An electronic switch comprising a pair of electrode structures each having a grid, a cathode and an anode, a common cathode resistor for said structure, a common anode resistor for said anodes, means biasing one of said electrode structures to the current passing condition as a result of which current flows in said common cathode resistor and biases said other electrode structure to cut-off, means supplying recurring waves to said one structure of such polarity and magnitude as to bias said one structure recurringly to cut-off thus causing current to flow in said other structure during the application of said recurring waves, means supplying the grid of said other structure with modulation, and means connected between the anodes of said structures for neutralizing the effect of the rise in voltage on the anode of said one structure in its cut-off condition by an equal drop in voltage caused by the current flow in the other structure, for a predetermined level of modulation, said last means including a resistor shunted by a condenser, the value of said condenser being such as to match the shape of the pulse created by the rise in voltage on one anode with the shape of the pulse created by the drop in voltage on the other anode.

13. An electronic switch comprising two grid-controlled electrode structures, means for applying signal waves to the grids of both structures, means whereby negative pulses of signal applied to the grid of one structure produces a flow of current through the other structure, an output circuit coupled to the anode of said other structure, and a network comprising a resistor shunted by a condenser connected between the anodes of both structures.

14. An electronic switch comprising two grid-controlled electrode structures, means for applying signal waves to the grids of both structures, a single anode resistor for said switch through which unidirectional potential is supplied to the anodes of both structures, means whereby negative pulses of signal applied to the grid of one structure produces a flow of current through the other structure, an output circuit coupled to the anode of said other structure, and a network comprising a resistor shunted by a condenser connected between the anodes of both structures.

15. In a pulse generating system, the method which includes producing recurring pulses of a single polarity and of constant amplitude in response to control waves, simultaneously producing other pulses of opposite polarity whose amplitude varies in accordance with the instantaneous amplitude of a modulating wave, matching the shapes of said pulses of opposite polarities at a predetermined amplitude level of the modulating wave, combining said pulses of different polarities, and producing output pulses of said opposite polarity solely when the amplitude of said other pulses differs from the amplitude of said first pulses.

16. In a pulse generating system, the method which includes producing recurring pulses of a positive polarity and of constant amplitude in response to control waves, simultaneously producing other pulses of negative polarity whose amplitude varies linearly in accordance with the instantaneous amplitude of a negative modulating wave, matching the shapes of said pulses of opposite polarities at a predetermined level of the modulating wave, combining said pulses of different polarities, and producing output pulses of negative polarity which are short compared to a cycle of the highest modulation frequency and short compared to the cycle of said recurring pulses solely when the amplitude of said other pulses differs from the amplitude of said first pulses.

17. In a pulse generating system, the method which includes producing recurring pulses of a single polarity and of constant amplitude in response to control waves, simultaneously producing other pulses of opposite polarity whose amplitude varies in accordance with the instantaneous amplitude of a modulating wave, matching the shapes of said pulses of opposite polarities at a predetermined level of the modulating wave, combining said pulses of different polarities, and producing output pulses solely when the amplitude of said other pulses differs from the amplitude of said first pulses.

WILLIAM D. HOUGHTON.

REFERENCES CITED

The following references are of record in the file of this patent:

UNITED STATES PATENTS

| Number | Name | Date |
|---|---|---|
| 2,478,919 | Hansell | Aug. 16, 1949 |